Feb. 5, 1929.  1,701,317
J. S. STOKES
WRAPPER GUMMING AND DELIVERY SYSTEM
Filed May 31, 1927  3 Sheets-Sheet 1

INVENTOR.
John S. Stokes
BY Cornelius D. Ehret
his ATTORNEY.

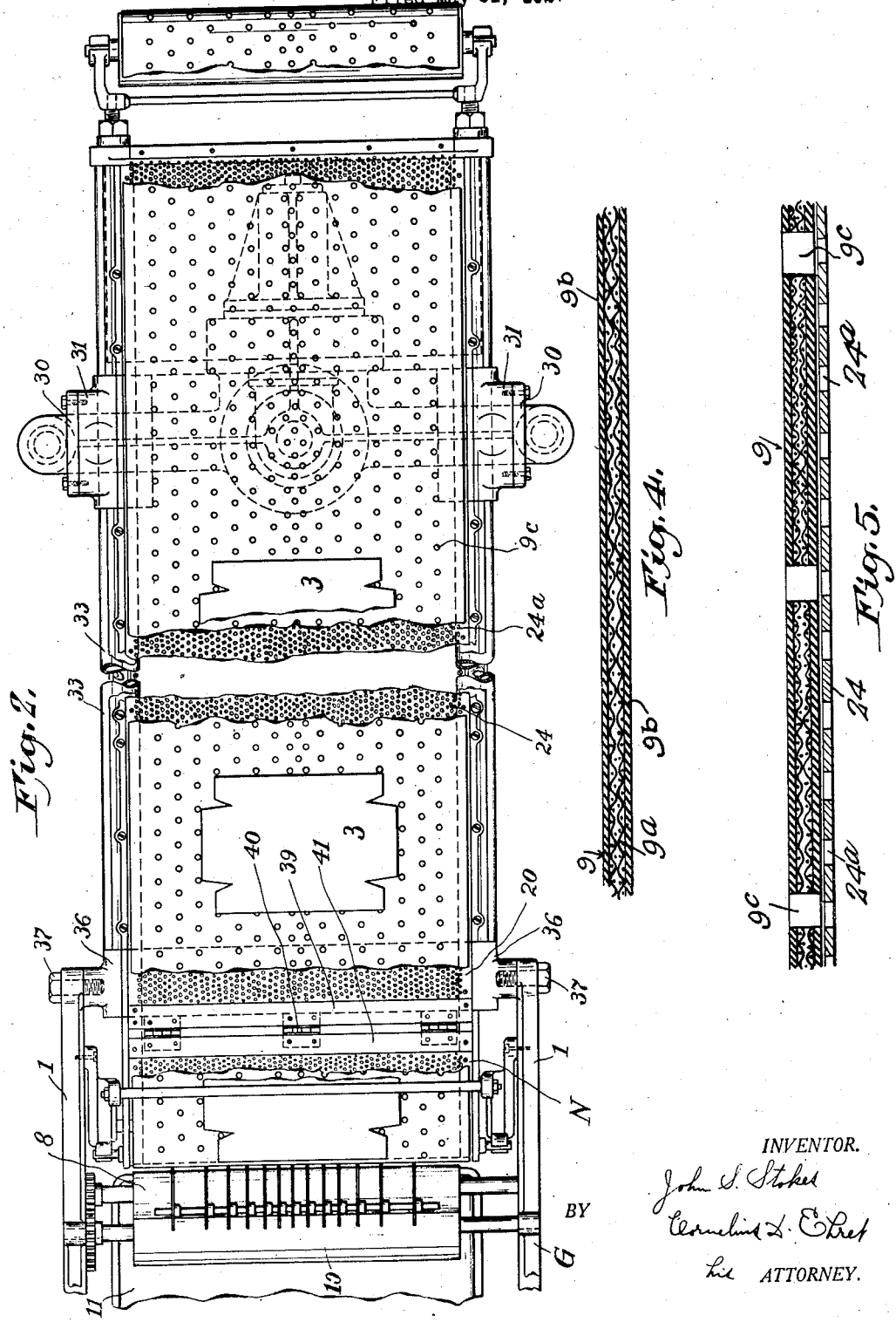

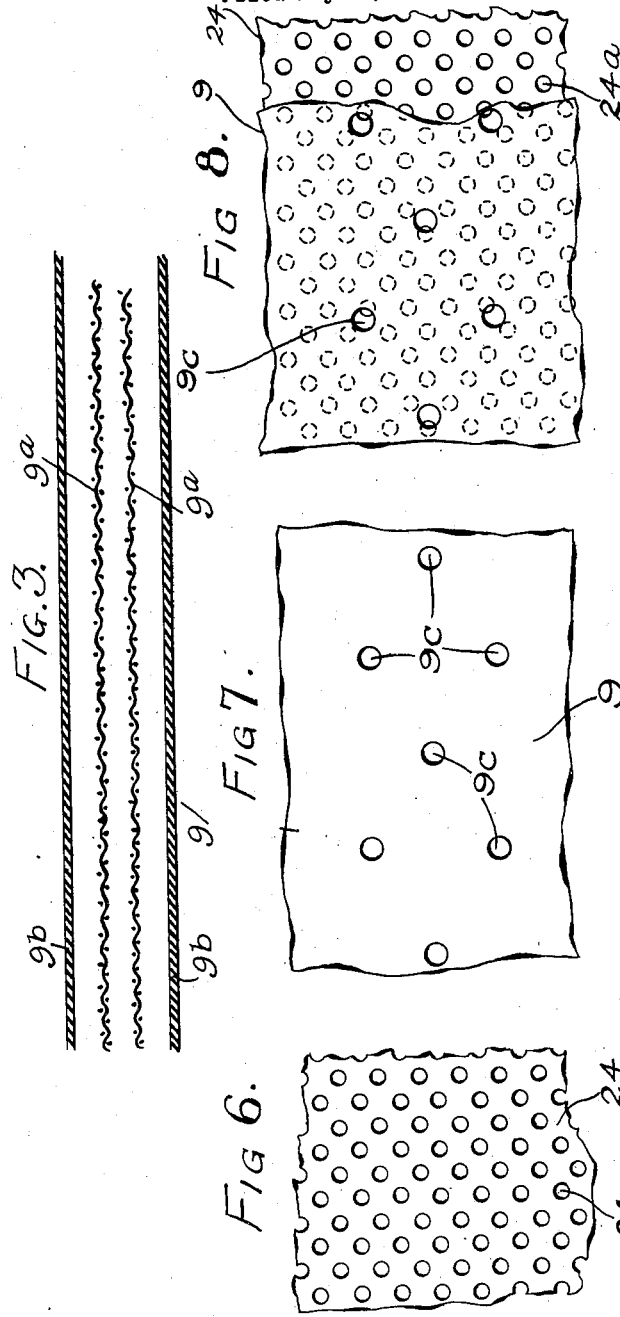

Patented Feb. 5, 1929.

1,701,317

UNITED STATES PATENT OFFICE.

JOHN S. STOKES, OF HUNTINGDON VALLEY, PENNSYLVANIA, ASSIGNOR TO STOKES AND SMITH COMPANY, OF PHILADELPHIA, PENNSYLVANIA, A CORPORATION OF PENNSYLVANIA.

WRAPPER GUMMING AND DELIVERY SYSTEM.

Application filed May 31, 1927. Serial No. 195,361.

My invention relates to a system for coating sheets, particularly wrappers or labels of paper or the like, with adhesive or other fluid material, and for conveying or transporting the coated sheets to a station where they are to be applied to boxes, packages, cartons, or the like.

In accordance with my invention, sheets, wrappers, labels or the like to which a coating of adhesive has been applied, are transported by an impervious belt, as of rubber composition, having apertures, through which the suction pressure of a suction chamber over which the conveyor belt passes is applied to the coated sheets to prevent them from bowing or curling under the influence of the adhesive. Previously, suction had been applied through the pores of a fabric or cloth-like belt to hold adhesive coated sheets in flat contact with the conveyor belt. To remove the accumulation of glue from the surface and pores of the fabric belt, it was necessary to remove the belt which resulted in delay and loss of use of the associated apparatus. Further the washing effected shrinkage, stretching and more or less irregular deformation of the belt and after several washings the glue became distributed to some extent throughout the fabric causing it to lose the porosity essential to transmission of suction therethrough.

Further in accordance with my invention, the apertures through the belt of impervious material are so spaced that there is exerted at numerous definite points distributed throughout the area or areas of the coated sheet or sheets, sufficient suction to hold it or them into intimate contact with the belt.

Still further in accordance with my invention, the suction chamber with which the apertured belt of impervious material cooperates is provided with an underlying member, as wire mesh, or a perforated plate whereby the belt will remain flat during movement over the suction chamber, preventing entry of air under the sheets through the belt apertures to the suction chamber with resultant loss of pressure. Still further in accordance with my invention, the perforations in the plate are of such diameter and so spaced and arranged that each aperture in the conveyor belt is always in communication with one or more plate perforations, whereby suction pressure is continuously exerted through each aperture.

My invention resides in combinations of devices and structural details hereinafter described and claimed.

For an illustration of one of the forms my structure may take, reference is to be had to the accompanying drawing in which:

Fig. 2 is a top plan view of the apparatus shown in Fig. 1.

Figs. 3 and 4 are cross-sections of the conveyor belt.

Fig. 5 is a detailed view showing in cross-section the cooperation between the perforations in the conveyor belt and an apertured guide plate.

Figs. 6 and 7 are detailed views in plan of the suction plate and conveyor belt respectively.

Fig. 8 is a detailed view in plan of the conveyor belt superposed on its perforated guide plate.

Figure 1:
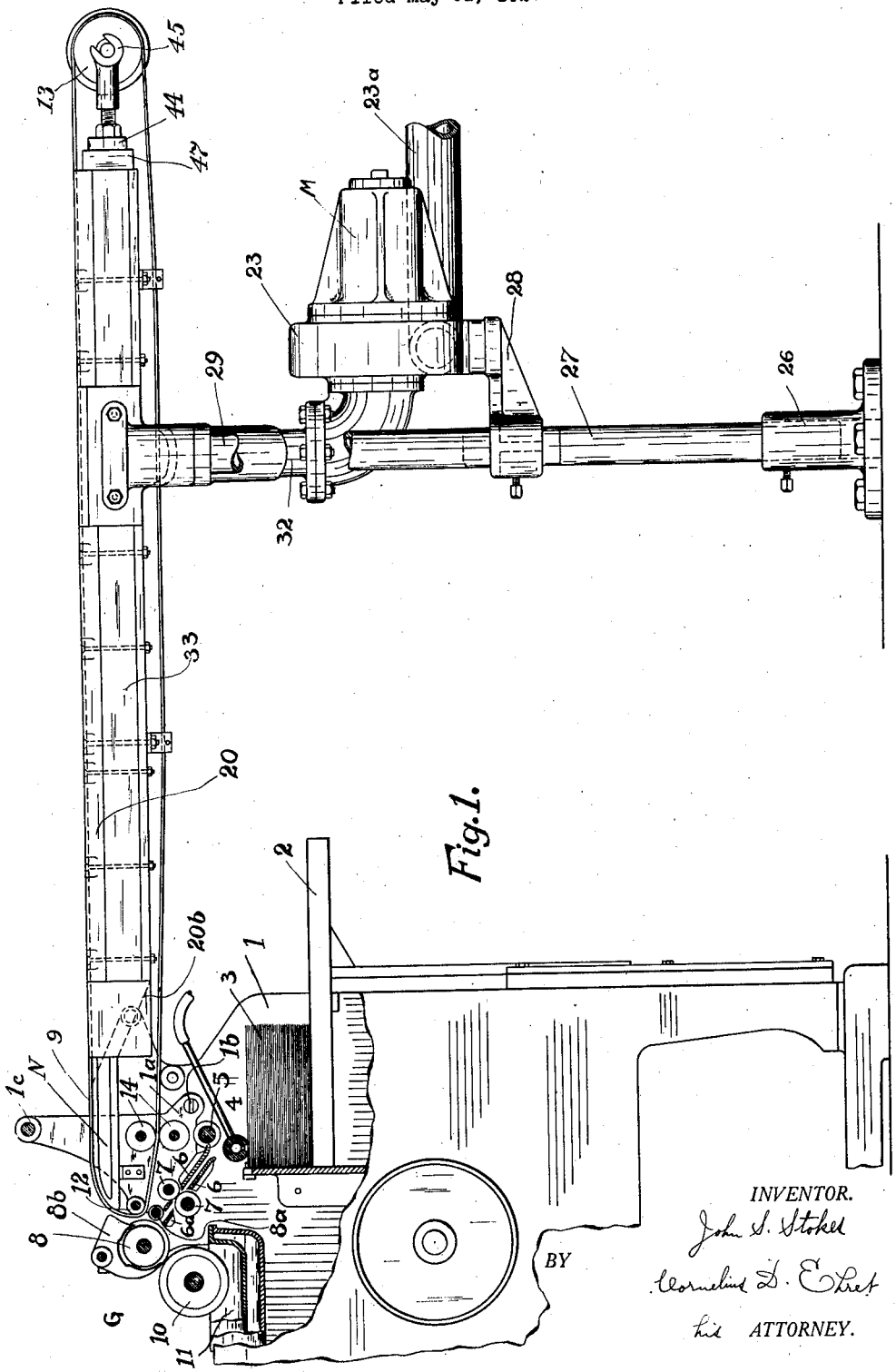
Fig. 1 is a side elevational view, partially in vertical section, of apparatus embodying my invention.

Referring to Figs. 1 and 2, G represents a machine for automatically applying glue or other adhesive to wrapper or label sheets in suction. The frame 1 of the machine G carries the table 2 upon which uncoated wrapper sheets 3 are disposed in a stack from which they are picked up in succession by the suction roll 4 and delivered between a pair of rolls 5, 5 the lower of which is not shown, which feed the wrapper sheets between the guide members 6, 6 and thence between a second pair of rolls 7, 7 which feed the sheets over the guide plate 6ª between the glue applying roll 8 and its companion roll 8ª. As the wrapper is adhesively coated on one side by the roll 8, to which adhesive is transmitted by the roll 10 dipping into adhesive held in the container 11, the wrapper is stripped from the roll 8 by stripper plates 8ᵇ and passed onto the conveyor apron or belt 9, with its coated face uppermost. The conveyor belt 9 may be of the nature of rubber belting or the like, comprising, for example, Fig. 3, one or more elements or layers 9ª of textile material, fabric or the like, of cotton or other suitable material, upon one or both sides of which are applied sheets 9ᵇ of soft rubber or equivalent impervious material. The fabric and rubber sheets are brought into intimate relation as by passage between rolls, whereupon the rubber is vulcanized into the fabric in the well known way practised by manufacturers of rubber belting to yield the structure illustrated in Fig. 4, the finished belt being of any suitable thickness, as for example, one-sixteenth inch. At suitable intervals there are punched through the belt, holes or apertures $9^c$ of suitable diameter for a purpose hereinafter described.

The belt 9 is continuously driven by the rolls 14 between which it passes; the belt 9 passes over the rolls 12 and 13 at opposite ends of the conveyor unit. The upper rolls 5 and 7, the upper guide plates 6, and the rolls $8^a$, 12 and 14, 14 are carried by a frame $1^a$, pivoted upon the frame 1 at $1^b$, and provided with the handle $1^c$ for throwing the frame $1^a$ and the parts carried thereby backwardly, in clockwise direction about the pivot $1^b$ to effect access to the feeding and gluing mechanism as some times becomes necessary when the feeding channels, rolls and mechanism become clogged by crumpled, torn or distorted wrappers.

The upper side of the conveyor belt 9 passes over and is supported by a hollow table, casing or chamber 20 constituting a suction chamber in which suitable subatmospheric pressure is maintained by a fan or other suction creating means 23. The suction chamber or table 20 extends from near one end to the other of the conveyor and is provided with the screen or perforated top 24 which is entirely covered by the conveyor, apron or belt 9, perforated as above described. The spacing of the apertures $9^c$ in the belt with respect to the perforations in the plate or screen 24 and the relative diameters of the apertures and perforations is such that each aperture $9^c$ is always in communication with one or more perforations in the plate $24^a$ whereby suction is continuously exerted through each aperture $9^c$ upon a wrapper or label 3 on the belt 9. The spacing of the apertures $9^c$ is such that there is exerted at numerous definite points distributed throughout the area of the wrapper or label 3 sufficient suction pressure to hold it into intimate or flat contact with the belt or conveyor as hereinbefore described. The conveyor belt or apron 9 may be unsupported by an underlying member, as 24, if kept flat, as by tension upon it between the end rolls 12, 13 to prevent entry of air between the wrappers or labels and the belt, and to prevent air entering into the suction chamber at the edges of the belt. However, it is preferred to utilize in association with the apertured belt described the underlying member 24 of any suitable character, as wire mesh, but preferably as indicated in Figs. 5, 6 and 8, a metallic sheet having perforations $24^a$, of suitable diameter and suitably spaced, as above described, whereby the conveyor belt 9 will always remain flat during its movement over the suction chamber, thereby preventing entry of air under the wrappers or labels 3 between them and the belt 9 and thence through it into the suction chamber with resultant loss of pressure upon the wrappers or labels.

The glue or other adhesive coating applied to the wrappers 3 in succession by the machine G causes them to curl or bow upwardly. The application of suction to the under and uncoated sides of the wrapper sheets causes an excess of atmospheric pressure on their uppermost or coated sides thereby holding them flat or straight in contact with the belt 9 and preventing them from rolling, curling or bowing, as would otherwise occur.

It is found in practice that the passage of the coated sheets 3 around the left end of the conveyor belt 9 at roller 12 first imparts to them a slightly upwardly bow form, and without the application of suction the action of the adhesive on the upper face of each sheet almost immediately causes its forward and rear edges to continue to turn or curl under and inwardly until the sheet assumes more or less of a cylindrical form with the coated side upward. By the application of fluid pressure as is more fully explained in copending application Serial No. 122,096, filed July 13, 1926, a force is applied to the sheet before it has had opportunity to curl at the edges and holds it flat to the apron or conveyor belt 9 as it travels upward therewith. It is found that after the sheet has passed some distance along the suction chamber it becomes more or less seasoned with the moisture of or from the adhesive coating and will then continue to lie flat or substantially so on the apron 9 after passage beyond the region of application of suction. The time required for such seasoning changes with variations in the nature or grade or paper or material of which the wrapper or label sheets are composed and with changes in the character and properties of the adhesive utilized.

The suction is produced by a fan or blower 23 driven by the electric motor M which is mounted upon a transversely extending bracket 28 adjustably supported on a rod 27 vertically adjustable in the stand or base 26. Extending upwardly from the brackets 28 are rods 29, 29 on whose upper ends are carried the members 30, 30 which support the tubular members 31, 31 connected by the hose 32, 32 with the suction inlet of the blower or fan 23. Carried by the members 31 are the longitudinally extending pipes or conduits 33 whose interiors are in communication through ports in the members 31 with the blower or fan 23 through the hose 32.

The longitudinally extending tubes or pipes 33, 33 constitute in effect side walls of the main suction chamber 20, which at its rear end at 20ᵇ is inclined rearwardly and upwardly to form a suction connection with a nose section N which coacts with the throw back frame 1ᵃ of the gluing machine G and is articulated with respect to the main suction chamber 20. On their inner sides the tubes 33 are provided with slots or ports, not shown, whereby the interior of the suction chamber 20 is in communication, at regions distributed throughout its length, with the suction producing means 23. At its rear end each of the tubes 33 terminates in member 36 pivoted upon a bolt 37 carried by and extending through the side frame 1 of the gluing machine G to permit adjustment of the conveyor and suction unit as a whole to bring its forward or right end to any suitable height. In each of the members 36 is a plug not shown which seals off the end of the associated tube 33.

Extending transversely of the conveyor and suction unit and secured at its opposite ends to members 36 is a bar or strip 39 upon which is pivoted, by hinges at 40, a similar transversely extending strip 41, to which is secured the aforesaid nose portion N of the suction chamber. The upwardly and rearwardly inclined portion 20ᵇ of the suction chamber engages the bottom and side walls of the suction chamber extension N, whose upper wall is comprised by perforated plate 24 extending practically to the extreme rear end, point or nose of member N, whereby suction is applied from practically substantially the extreme end of section N throughout that section and the main chamber 20.

Within the right or forward end of each of the tubes 33 is disposed a longitudinally movable plunger 44 carrying the bearing 45 for the roller 13 and thrust forwardly by a helical spring, not shown, confined within the fixed plug 47, whereby the bearing 45 is thrust to the right to maintain the apron or belt 9 under suitable tension.

When the frame 1ᵃ is thrown back for access to the feeding and gumming rolls of the machine G, the roller 12 carried by the frame 1ᵃ engages the underside 43 of the nose section N and rotates it in similar direction clockwise as viewed in Fig. 1, to a position in which the suction connection with the nose extension N is broken. Upon return of the frame 1ᵃ in counterclockwise direction to normal position, the nose extension assumes its normal position indicated in Fig. 1, reestablishing the suction connection with the main suction chamber.

As the wrapper or label sheets are adhesively coated by the machine G, in succession, they are delivered to the suction and conveyor unit, which transports them while held flat to a position where an operator may bring a box or similar article into contact and into register with the gummed side of the wrapper sheet while still upon the conveyor belt; or the operator may remove the gummed wrapper sheet from the belt 9 after it has passed to the right of the end of the suction chamber 20, and place it on a table where a box or similar article may then be brought into register therewith, and thereafter the registered wrapper and box may be placed in a wrapping machine, as for example of the character disclosed in Letters Patent 691,329 or 1,541,255; or the gummed wrappers may be automatically fed to a position adjacent the wrapping machine. Previously the conveyor belt or apron 9 has consisted of fabric or other porous clothlike material and it was formerly necessary from time to time to remove therefrom the adhesive or glue which had accumulated thereon. The washing necessary to remove the glue or adhesive is effected by removing the belt from the apparatus involving delay and loss of use of the machine in question and associated machines depending upon the output of the conveyor. Furthermore as a result of the washing there occurs shrinkage, stretching by deformation more or less irregular, of the fabric belt interfering with its satisfactory drive by the rolls 14, 14 when replaced in the machine. In addition after several washings, glue or adhesive becomes to some extent distributed throughout the fabric belt causing it to lose the porosity essential to transmission of suction therethrough. To overcome these difficulties the apron or belt is constructed of any suitable material or materials proof against substantial absorption of adhesive and wash water and non-porous as regards transmission through the apron or belt of the suction pressure which is applied through apertures of suitable size and spacing punched through the body of the apron. Accumulation of glue or adhesive upon the rubber or equivalent belt or apron 9 is readily washed therefrom without removal from the machine and without consequent stretching, shrinkage or deformation of the apron.

What I claim is:

1. In a sheet-gumming and transport system, apparatus for transporting sheets coated with unset adhesive comprising a non-metallic conveyor belt, the sheet-engaging surface of said belt being non-porous, said belt having definitely formed apertures extending therethrough, and means for exerting suction through said apertures to hold the sheets flat upon said belt and prevent their deformation during transport thereby.

2. In a sheet-gumming and transport system, apparatus for transporting sheets coated with unset adhesive comprising a non-metallic fibrous conveyor belt having a non-porous sheet-engaging surface, said belt having definitely formed apertures extending through said non-porous surface, and means for exerting suction through said apertures to hold the sheets flat upon said belt and prevent their deformation during transport thereby.

3. In a sheet-gumming and transport system, apparatus for transporting sheets coated with unset adhesive comprising a non-metallic conveyor belt, the sheet-engaging surface of said belt being non-porous, said belt having definitely formed apertures extending through said surface, a suction chamber, a plate intervening between said suction chamber and said belt, said plate having perforations of such size and distribution that the perforations of said belt are substantially continuously in communication with said suction chamber.

JOHN S. STOKES.